United States Patent [19]
Biesmans et al.

[11] Patent Number: 5,869,545
[45] Date of Patent: Feb. 9, 1999

[54] ORGANIC AEROGELS

[75] Inventors: Guy Leon Biesmans; David Randall, both of Everberg; Els Van Isterdael, Roosdaal, all of Belgium

[73] Assignee: Inperial Chemical Industries PLC, London, United Kingdom

[21] Appl. No.: 952,427

[22] PCT Filed: Apr. 29, 1996

[86] PCT No.: PCT/EP96/01782

§ 371 Date: Feb. 18, 1998

§ 102(e) Date: Feb. 18, 1998

[87] PCT Pub. No.: WO96/36654

PCT Pub. Date: Nov. 21, 1996

[30] Foreign Application Priority Data

May 18, 1995 [EP] European Pat. Off. ............... 95201302

[51] Int. Cl.$^6$ .................................................. C08G 18/32
[52] U.S. Cl. ........................... 521/117; 521/128; 521/130; 521/155

[58] Field of Search ...................................... 521/117, 128, 521/130, 155

[56] References Cited

U.S. PATENT DOCUMENTS 3,574,150  4/1971  Jefferson et al. .
5,260,344  11/1993  Ashida et al. .
5,478,867  12/1995  Tabor ...................................... 521/163

FOREIGN PATENT DOCUMENTS

WO 95 02009  1/1995  WIPO .
WO 95 03358  2/1995  WIPO .

*Primary Examiner*—Morton Foelak

[57] ABSTRACT

Preparation of polyisocyanate-based aerogels in the presence of polyfunctional isocyanatge-reactive compounds having an average nominal hydroxyl functionality 2 to 4 and number average molecular weight 50 to 5000, especially linear glycols containing from 2 to 30 carbon atoms.

10 Claims, No Drawings

ORGANIC AEROGELS

The present invention relates to polyisocyanate based aerogels and to methods for their preparation.

Aerogels are a unique class of ultrafine cell size, low density, open-celled foams. Aerogels have continuous porosity and their microstructure with pore sizes below the free mean path of air (pore sizes in the nanometer range) is responsible for their unusual thermal properties.

Organic aerogels based on polyisocyanate chemistry are described in WO 95/03358.

They are prepared by mixing a polyisocyanate and a trimerisation catalyst and optionally a higher functionality isocyanate-reactive compound in a suitable solvent and maintaining said mixture in a quiescent state for a sufficiently long period of time to form a polymeric gel. The gel so formed is then supercritically dried.

During the drying the gel shrinks substantially leading to an increase in density of the obtained aerogel.

Therefore it is an object of the present invention to provide a method for preparing polyisocyanate-based organic aerogels of lower density.

Accordingly, the present invention provides a method for preparing a polyisocyanate based organic aerogel comprising the steps of a) mixing an organic polyisocyanate, a polyfunctional isocyanate-reactive compound and an isocyanate trimerisation catalyst in a suitable solvent, b) maintaining said mixture in a quiescent state for a sufficiently long period of time to form a polymeric gel, and c) supercritically drying the obtained gel, wherein the polyfunctional isocyanate-reactive compound comprises a compound of average nominal hydroxyl functionality 2 to 8 and number average molecular weight 50 to 10000.

The polyfunctional isocyanate-reactive compound for use in the process of the present invention preferably has an average nominal hydroxyl functionality 2 to 4, more preferably 2 to 3 and number average molecular weight between 50 and 5000, more preferably between 50 and 1000. It is preferred to use linear chain polyfunctional isocyanate-reactive compounds.

Suitable polyfunctional isocyanate-reactive compounds for use in the process of the present invention include polyols, polyamines, polyesters and alkyleneoxide reaction products of these compounds, such as reaction products with ethyleneoxide, propyleneoxide or butyleneoxide. Preferred polyfunctional isocyanate-reactive compounds for use in the process of the present invention include low molecular weight, preferably linear glycols, containing from 2 to 30, preferably from 3 to 24, most preferably from 4 to 10 carbon atoms; these glycols may also contain heteroatoms such as oxygen.

Most preferred polyfunctional isocyanate-reactive compounds for use in the process of the present invention include ethyleneglycol, diethyleneglycol, triethyleneglycol, tripropyleneglycol, dipropyleneglycol, propyleneglycol and especially butanediol and hexanediol.

In the process of the present invention one of said polyfunctional isocyanate-reactive compounds is used but two or more different ones can also be used.

In one embodiment of the present invention the polyfunctional isocyanate-reactive compound is mixed with the polyisocyanate and trimerisation catalyst and optionally also a urethane or gel catalyst whereupon reaction takes place.

In another embodiment of the present invention the polyfunctional isocyanate-reactive compound is pre-reacted with some polyisocyanate so as to form an isocyanate-terminated prepolymer which is then mixed with additional polyisocyanate and trimerisation catalyst and reacted. This prepolymer preferably has an isocyanate value of about 20 and a molecular weight of about 3000. Examples of suitable isocyanate-terminated prepolymers are described in EP-A-0582385.

Mixtures of non-pre-reacted polyfunctional isocyanate-reactive compounds and pre-reacted polyfunctional isocyanate-reactive compounds (so in the form of isocyanate-terminated prepolymers) may also be used.

The polyfunctional isocyanate-reactive compound is used in the process of the present invention in such an amount that 10 to 60%, preferably 40 to 60% by weight of the NCO groups originally present are reacted therewith.

Aerogels prepared according to the process of the present invention have a lower density (due to a decrease in shrinkage, in some case more than 30%) than those prepared in the absence of a polyfunctional isocyanate-reactive compound as defined above.

Densities of the obtained aerogels are generally in the range 1 to 1000 kg/m$^3$, more generally in the range 10 to 800 kg/m$^3$ and even more generally in the range 20 to 400 kg/m$^3$ or even 30 to 300 kg/m$^3$ or even 90 to 200 kg/m$^3$.

The aerogels prepared according to the process of the present invention generally have pore sizes in the range 1 to 100 nm, more generally in the range 5 to 50 nm and even more generally in the range 5 to 25 nm.

Surface areas of the aerogels prepared according to the process of the present invention are generally in the range 10 to 1500 m$^2$/g, more generally in the range 50 to 1200 m$^2$/g and even more generally in the range 100 to 1000 m$^2$/g or even 150 to 500 m$^2$/g.

Polyisocyanates for use in the present method for preparing the polyisocyanate-based aerogels include aliphatic, cycloaliphatic, araliphatic and aromatic polyisocyanates known in the literature for use generally in the production of polyurethane/polyisocyanurate materials. Of particular importance are aromatic polyisocyanates such as tolylene and diphenylmethane diisocyanate in the well known pure, modified and crude forms, in particular diphenylmethane diisocyanate (MDI) in the form of its 2,4'-, 2,2'- and 4,4'-isomers (pure MDI) and mixtures thereof known in the art as "crude" or polymeric MDI (polymethylene polyphenylene polyisocyanates) having an isocyanate functionality of greater than 2 and the so-called MDI variants (MDI modified by the introduction of urethane, allophanate, urea, biuret, carbodiimide, uretonimine or isocyanurate residues). Further suitable polyisocyanates include fluorinated polyisocyanates as described in PCT Patent Application No. EP96/00340, incorporated herein by reference.

The polyisocyanate is used in amounts ranging from 0.5 to 30% by weight, preferably from 2 to 20% by weight and more preferably from 3 to 10% by weight based on the total reaction mixture.

Trimerisation catalysts for use in the present preparation method include any isocyanate trimerisation catalyst known in the art such as quaternary ammonium hydroxides and sales, alkali metal and alkaline earth metal hydroxides, alkoxides and carboxylates, for example potassium acetate and potassium 2-ethylhexoate, certain tertiary amines and non-basic metal carboxylates, for example lead octoate, and symmetrical triazine derivatives. Especially the triazine derivatives are preferred. Specific preferred trimerisation catalysts for use in the present method are Polycat 41 available from Abbott Laboratories, and DABCO TMR, TMR-2 and TMR-4 available from Air Products.

The polyisocyanate/catalyst weight ratio varies between 5 and 1000. The preferred polyisocyanate/catalyst weight ratio depends on the amount of polyisocyanate used, the reaction/cure temperature, the solvent used, additives used.

The preferred polyisocyanate/catalyst ratios vary between 100 and 400 for about 20 wt % polyisocyanate, between 50 and 200 for about 15 wt % polyisocyanate and between 10 and 100 (preferably between 30 and 60) for about 10 wt % polyisocyanate.

The solvent to be used in the preparation method according to the present invention should be a solvent for the monomeric (non-reacted) polyisocyanate as well as for the polymeric (reacted) polyisocyanate. The solvent power should be such as to form a homogeneous solution of non-reacted compounds and to dissolve the reaction product or at least prevent flocculation of the reaction product. Solvents with a δ Hansen solubility parameter between 10 and 35 $MPa^{1/2}$, preferably between 15 and 30 $MPa^{1/2}$, most preferably between 18 and 26 $MPa^{1/2}$ are most suitable. Further the critical pressure and critical temperature of the solvent should be as low as possible so as to simplify the critical drying step.

Suitable solvents for use in the method according to the present invention include hydrocarbons, dialkyl ethers, cyclic ethers, ketones, alkyl alkanoates, aliphatic and cycloaliphatic hydrofluorocarbons, hydrochlorofluorocarbons, chlorofluorocarbons, hydrochlorocarbons, halogenated aromatics and fluorine-containing ethers. Mixtures of such compounds can also be used.

Suitable hydrocarbon solvents include lower aliphatic or cyclic hydrocarbons such as ethane, propane, n-butane, isobutane, n-pentane, isopentane, cyclopentane, neopentane, hexane and cyclohexane.

Suitable dialkyl ethers to be used as solvent include compounds having from 2 to 6 carbon atoms. As examples of suitable ethers there may be mentioned dimethyl ether, methyl ethyl ether, diethyl ether, methyl propyl ether, methyl isopropyl ether, ethyl propyl ether, ethyl isopropyl ether, dipropyl ether, propyl isopropyl ether, diisopropyl ether, methyl butyl ether, methyl isobutyl ether, methyl t-butyl ether, ethyl butyl ether, ethyl isobutyl ether and ethyl t-butyl ether.

Suitable cyclic ethers include tetrahydrofuran.

Suitable dialkyl ketones to be used as solvent include acetone and methyl ethyl ketone.

Suitable alkyl alkanoates which may be used as solvent include methyl formate, methyl acetate, ethyl formate and ethyl acetate.

Suitable hydrofluorocarbons which may be used as solvent include lower hydrofluoroalkanes, for example difluoromethane, 1,2-difluoroethane, 1,1,1,4,4,4-hexafluorobutane, pentafluoroethane, 1,1,1,2-tetrafluoroethane, 1,1,2,2-tetrafluoroethane, pentafluorobutane, tetrafluoropropane and pentafluoropropane.

Suitable hydrochlorofluorocarbons which may be used as solvent include chlorodifluoromethane, 1,1-dichloro-2,2,2-trifluoroethane, 1,1-dichloro-1-fluoroethane, 1-chloro-1,1-difluoroethane, 1-chloro-2-fluoroethane and 1,1,1,2-tetrafluoro-2-chloroethane.

Suitable chlorofluorocarbons which may be used as solvent include trichlorofluoromethane, dichlorodifluoromethane, trichlorotrifluoroethane and tetrafluorodichloroethane.

Suitable hydrochlorocarbons which may be used as solvent include 1- and 2-chloropropane and dichloromethane.

Suitable halogenated aromatics include monochlorobenzene and dichlorobenzene.

Suitable fluorine-containing ethers which may be used as solvent include bis-(trifluoromethyl) ether, trifluoromethyl difluoromethyl ether, methyl fluoromethyl ether, methyl trifluoromethyl ether, bis-(difluoromethyl) ether, fluoromethyl difluoromethyl ether, methyl difluoromethyl ether, bis-(fluoromethyl) ether, 2,2,2-trifluoroethyl difluoromethyl ether, pentafluoroethyl trifluoromethyl ether, pentafluoroethyl difluoromethyl ether, 1,1,2,2-tetrafluoroethyl difluoromethyl ether, 1,2,2,2-tetrafluoroethyl fluoromethyl ether, 1,2,2-trifluoroethyl difluoromethyl ether, 1,1-difluoroethyl methyl ether, 1,1,1,3,3,3-hexafluoroprop-2-yl fluoromethyl ether.

Another suitable solvent is N-methylpyrolidone.

Preferred solvents for use in the method according to the present invention are dichloromethane, methyl ethyl ketone, tetrahydrofuran, monochlorobenzene, trichlorofluoromethane (CFC 11), chlorodifluoromethane (HCFC 22), 1,1,1-trifluoro-2-fluoroethane (HFC 134a), 1,1-dichloro-1-fluoroethane (HCFC 141b) and mixtures thereof such as HCFC 141b/CFC 11 mixtures.

Another suitable solvent is liquid carbondioxide ($CO_2$). Liquid carbondioxide may be used under various pressures (above 63 bar) and temperatures. Also sub- or supercritical carbondioxide can be used as a solvent. The solvent power of sub- or supercritical carbondioxide can be adjusted by adding suitable modifiers such as methanol, ethanol, acetone, HCFC 22, dichloromethane in levels of 0.1 to 50% by volume.

In case liquid carbondioxide is used as solvent it has shown to be an advantage to use as polyisocyanate in the preparation of the present aerogels a fluorinated isocyanate-ended prepolymer made from a polyisocyanate and a fluorinated isocyanate-reactive compound such as a fluorinated monol or diol.

Other suitable solvents include $C_1$–$C_8$ hydrocarbons in sub- or supercritical state. The solvent power of these sub- or supercritical $C_1$–$C_8$ hydrocarbons can be adjusted by using suitable modifiers.

The polyisocyanate, the catalyst, the solvent and the polyfunctional isocyanate-reactive compound, optionally in the form of an isocyanate-terminated prepolymer are mixed by simply shaking the reaction vessel or by slowly stirring the mixture. Alternatively the polyisocyanate, the solvent and the polyfunctional isocyanate-reactive compound, optionally in the form of an isocyanate-terminated prepolymer are first mixed and subsequently the catalyst is added hereto. Some catalyst may also be added after the gelling for enhancing post-cure.

Mixing can be done at room temperature or at somewhat higher temperatures.

In case of low boiling solvents (boiling point below room temperature), for example HCFC 22, the solvent is added to a pressure vessel containing the polyisocyanate, the catalyst(s) and the polyfunctional isocyanate-reactive compound, under its own vapour pressure.

Thereafter the mixture is left standing for a certain period of time to form a polymeric gel. This time period varies from 1 minute to several weeks depending on the system and the targeted void size and density. Temperatures in the range of from about 20° C. to about 50° C., preferably 40° to 45° C. may be employed, a temperature of about 10° C. below the boiling point of the solvent used being preferred.

In the case of low boiling solvents such as HCFC 22 the pressure in the closed vessel is maintained at its saturated vapour pressure and the gelation reaction is carried out at higher temperatures (preferably in the range 30° to 50° C.). At these elevated reaction temperatures DABCO TMR is the preferred trimerisation catalyst.

Although the mixture gels within a few hours, it has been found to be advantageous to cure the gels for a minimum of 24 hours so as to obtain a solid gel that can be easily handled in subsequent processing. A postcure cycle at elevated temperatures can be included.

Supercritical drying of the aerogels involves placing the solvent-filled gel in a temperature-controlled pressure vessel and bringing the vessel to a pressure above the critical pressure of the solvent (for example by filling with nitrogen gas or by pumping compressed solvents onto the gel). At that point the vessel is then heated above the critical temperature of the solvent. After a few hours the pressure is slowly released from the vessel while keeping a constant temperature. At atmospheric pressure and after a cool down period the aerogel is removed from the vessel.

Before the supercritical drying step the gel may be exchanged into a solvent more suitable for supercritical drying, for example liquid carbondioxide, possibly via an intermediate solvent such as acetone or via liquid carbondioxide containing modifiers.

Further suitable additives to be used in the process of the present invention and further suitable processing methods are described in WO 95/03358, which is incorporated herein by reference.

The aerogels of the present invention have various applications. A few examples are described hereinafter.

Aerogel particles can be blended in the polyisocyanate and/or polyol compositions for use in preparing polyurethane foams. Subsequent foaming leads to foams loaded with solid polyisocyanate-based aerogel particles which may enhance physical properties, thermal insulation properties and fire performance of the resultant foams. This concept can also be used in the preparation of other types of foam such as thermoplastic foams made via an extrusion process.

Aerogel particles can be used as thickening agents. Due to the high surface area of these aerogels liquids can be absorbed resulting in thickening (viscosity increase) of any liquid phase. This could be used to increase the viscosity of polyisocyanate and/or polyol compositions for use in the preparation of polyurethane foams. At certain loadings of aerogel particles pastes can be formed which can then be processed via extrusion technology.

Aerogel particles can be glued together using binders or adhesives. A block of material is obtained which consists mainly of aerogel.

Aerogel blocks can be made by putting aerogel particles/powders in a mould and compressing them with or without temperature increase and optionally under inert atmosphere to make a compacted aerogel block.

The aerogels of the present invention can also be used to fill the voids of an open celled foam filler material in an evacuated insulation panel. By doing so the aged thermal insulation properties of the evacuated insulation panel can be improved.

A preferred method for filling the voids of the open celled foamed material involves soaking the open celled foamed material in a solution containing the ingredients to make the aerogel and forming the aerogel in situ by the process as described above.

The present invention is illustrated but not limited by the following examples.

SUPRASEC is a trademark of Imperial Chemical Industries.

EXAMPLE 1

10 g of polyisocyanate SUPRASEC DNR (available from Imperial Chemical Industries PLC) and 0.33 g butanediol were dissolved in 92.97 g dichloromethane (10% solids, 10% NCO-conversion). 0.2 g of catalyst TMR (available from Air products) were added to the mixture while stirring. The mixture was left to gel. A sol-gel was formed in the following hours. The sol-gel was solvent exchanged for liquid $CO_2$ in a pressure cel. After complete removal of the $CH_2Cl_2$ the sol-gel was supercritically dried from $CO_2$ (T>32° C., p>73 bar). The obtained aerogel has the characteristics as summarised in Table 1.

In an analogous way aerogels were made with different amounts of butanediol (different NCO conversions). The characteristics are also mentioned in Table 1.

TABLE 1

| % NCO | | 0 | 10 | 20 | 30 | 50 |
|---|---|---|---|---|---|---|
| shrinkage | % | 68 | 65 | 62 | 57 | 48 |
| density | kg/m$^3$ | 360 | 408 | 337 | 316 | 260 |
| surface area | m$^2$/g | 770 | 299 | 242 | 226 | 114 |
| pore size | nm | 8.9 | | 19.9 | | |

EXAMPLE 2

Example 1 was repeated at a different solids level (3%) The results are listed in Table 2.

TABLE 2

| % NCO | | 0 | 10 | 20 | 40 |
|---|---|---|---|---|---|
| shrinkage | % | 73.5 | 77.4 | 69.4 | 53.8 |
| density | kg/m$^3$ | 176 | 190 | 151 | 97.5 |
| surface area | m$^2$/g | 389 | 290 | 253 | 160 |

The above results show that shrinkage and thus density decreases for aerogels prepared in the presence of butanediol at a level above 20% NCO conversion.

EXAMPLE 3

Example 1 was repeated at different solids levels and isocyanate conversion levels using either butandiol or hexanediol as polyfunctional isocyanate-reactive compound. The results are listed in Table 3.

TABLE 3

| | | hexanediol | hexanediol | hexanediol | butanediol |
|---|---|---|---|---|---|
| NCO conversion | % | 20 | 40 | 60 | 20 |
| solids | % | 10 | 10 | 10 | 10 |
| shrinkage | % | 57 | 53 | 46 | 62 |
| density | kg/m$^3$ | 350 | 309 | 257 | 337 |
| surface area | m$^2$/g | 346 | 188 | 115 | 242 |

EXAMPLE 4

Polyisocyanate SUPRASEC X2185 (available from Imperial Chemical Industries) was mixed with a polyfunctional isocyanate-reactive compound (diethyleneglycol (DEG) or tripropyleneglycol (TPG) or with an isocyanate-terminated prepolymer (SUPRASEC X2433 or SUPRASEC X2980, both available from Imperial Chemical Industries) so that the isocyanate value of the final mixture was 25. 3% by weight of this mixture was dissolved into dichloromethane to which TMR catalyst (available from Air Products) was added so as to achieve a polyisocyanate/catalyst ratio of 50.

The mixture was left to gel and subsequently supercritically dried.

The results are summarised in Table 4.

TABLE 4

|  |  | X2185 | X2185 + DEG | X2185 + TPG | X2185 + X2433 | X2185 + X2980 |
|---|---|---|---|---|---|---|
| shrinkage | % | 68 | 65 | 77 | 85 | 83.6 |
| density | kg/m$^3$ | 360 | 134 | 201 | 272 | 287 |
| surface area | m$^2$/g | 770 | 279 | 342 |  |  |

We claim:

1. Method for preparing a polyisocyanate-based aerogel comprising the steps of
    a) mixing an organic polyisocyanate, a polyfunctional isocyanate-reactive compound and an isocyanate trimerisation catalyst in a suitable solvent,
    b) maintaining said mixture in a quiescent state for a sufficiently long period of time to form a polymeric gel, and
    c) supercritically drying the obtained gel, characterised in that the polyfunctional isocyanate-reactive compound comprises butanediol or hexanediol.

2. Method according to claim 1 wherein said polyfunctional isocyanate-reactive compound is used in such an amount that 20 to 60% by weight of the NCO groups originally present are reacted.

3. Method according to claim 1 wherein the organic polyisocyanate is diphenylmethane diisocyanate or polymethylene polyphenylene polyisocyanate.

4. Method according to claim 3 wherein the organic polyisocyanate is used in amounts ranging from 0.5 to 30% by weight based on the total reaction mixture.

5. Method according to claim 1 wherein the isocyanate trimerisation catalyst is a triazine derivative or a quaternary ammonium salt derivative.

6. Method according to claim 1 wherein the polyisocyanate/catalyst weight ratio is between 5 and 1000.

7. Method according to claim 1 wherein the solvent is dichloromethane.

8. Method according to claim 1 wherein the solvent is exchanged prior to supercritically drying the gel.

9. Method according to claim 8 wherein the solvent is exchanged into liquid carbon dioxide.

10. Polyisocyanate-based aerogel obtainable by the method as defined in claim 1.

* * * * *